United States Patent [19]

Byrne

[11] 4,162,138
[45] Jul. 24, 1979

[54] FLOATING INSERT INJECTION MOLD

[75] Inventor: John R. Byrne, Watertown, Wis.

[73] Assignee: Will Ross Inc., Milwaukee, Wis.

[21] Appl. No.: 864,177

[22] Filed: Dec. 27, 1977

[51] Int. Cl.² .............................................. B29F 1/10
[52] U.S. Cl. ...................................... 425/125; 249/91;
   425/129 R; 425/436 R; 425/451.9
[58] Field of Search ................. 425/125, 129 R, 451.2,
   425/451.9, 436 R, 110, 111, 128; 249/83, 91, 66 R, 95; 264/272

[56] References Cited

U.S. PATENT DOCUMENTS

| | | | |
|---|---|---|---|
| 391,198 | 6/1883 | Chapuis | 425/129 |
| 2,304,984 | 12/1942 | Wood | 249/91 X |
| 2,655,692 | 10/1953 | Fay | 249/91 |
| 3,467,986 | 9/1969 | Canty et al. | 249/91 X |
| 3,471,609 | 10/1969 | Belanger et al. | 425/129 X |
| 3,712,575 | 1/1973 | Bement et al. | 249/91 |
| 4,017,239 | 4/1977 | O'Connell et al. | 425/451.9 |

Primary Examiner—William R. Briggs
Attorney, Agent, or Firm—John A. Dhuey

[57] ABSTRACT

An injection mold for encapsulating inserts is described having means to apportion mold clamping forces to simultaneously close the parting line of the mold and rigidly clamp an insert within the mold cavity, whereby inserts of various thicknesses can be accommodated.

6 Claims, 6 Drawing Figures

FLOATING INSERT INJECTION MOLD

The present invention is concerned generally with injection mold assemblies. More particularly, it is concerned with injection mold assemblies employed to mold about an insert placed within the mold cavity and to accomodate inserts of varying thicknesses within the mold cavity.

Injection molds for encapsulating inserts generally have employed one set of movable, spring or hydraulically loaded insert clamping pins within the mold assembly and one set of rigid pins opposed to the movable pins to hold an insert stationary within a mold cavity during the time molten material is injected.

In a conventional injection mold, the stationary half of the mold, known in the industry as the "A" side is bolted to the front platen of the machine. The ejector half, called the "B" side, is bolted to the molding machine's movable platen. Normally the B side is as rigid a structure as can be attained, while still leaving an opening between the support plate and the bottom clamping plate for an ejector plate to move. The bottom clamping plate is doweled and bolted through rails and through the support plate directly to the B plate. Clamping force is transmitted through this rigid assembly to the mold parting line. The clamping force needs to be great enough to hold the A and B plates together during injection when the molten material entering the mold cavities acts like an hydraulic system, trying to force these two plates apart. The amount that these two plates can be allowed to separate during injection and still make acceptable parts is dependent on the molding material and how small an opening it will flash into. Many materials will show flash with openings of less than 0.002 inches (0.05 cm).

Inserts can be loaded into such molds and held rigidly fixed if their thickness across the parting line is held to a tolerance that is less than the amount that would hold the mold open far enough for the parting line to flash if they were thick, or that would allow flash over the inserts if they were thin. This tolerance will depend on the particular type of molding material and is normally in the range of 0.0005-0.005 inches total.

To accomodate inserts that vary more, the mold is usually fitted with sliding members, such as pins or sleeves, that are either spring loaded or hydraulically operated. These members exert pressure on the inserts when the mold is closed to prevent movement from the molding pressure and to prevent flash. The pressure required is related to the cross-sectional area of the insert exposed to the plastic and to the effective injection pressure. Since most injection molding machines are capable of about 20,000 psi injection pressure an idea of the forces involved is obvious.

Spring loading has been the simplest method of compensating for insert thickness variation, but it has several drawbacks. The spring pre-load must be adequate to withstand full pressures when holding the thinnest insert, so when insert thickness goes up, so does spring pressure. If thickness variation is great, this pressure can increase to almost double the amount needed for thin inserts. This force must be overcome by mold closing, so the molding machine requires more clamp tonnage to hold the mold closed as insert thickness increases. It is also necessary to preload these springs so assembling such a mold becomes a problem. Hydraulic systems to replace the springs produce a uniform force regardless of insert thickness and do not require any pre-loading in the mold assembly. However, they must be tied into the machine cycle and into a high pressure power supply. They are expensive to install and operate, they have seals and other moving parts to wear and require maintenance and repair. The forces they transmit to the inserts must also be born by the molding machine clamp.

In order to correct the deficiencies in the above noted systems, the present invention utilizes means between the sliding members and the "B" plate of the mold to apportion the mold lock-up or clamping forces for simultaneously holding the parting line closed and holding the inserts stationary during the injection step. In a preferred embodiment, the apportionment means is a lever action between the sliding members and the "B" plate of the mold.

The invention is best understood with reference to the following drawings in which.

Figure 1:
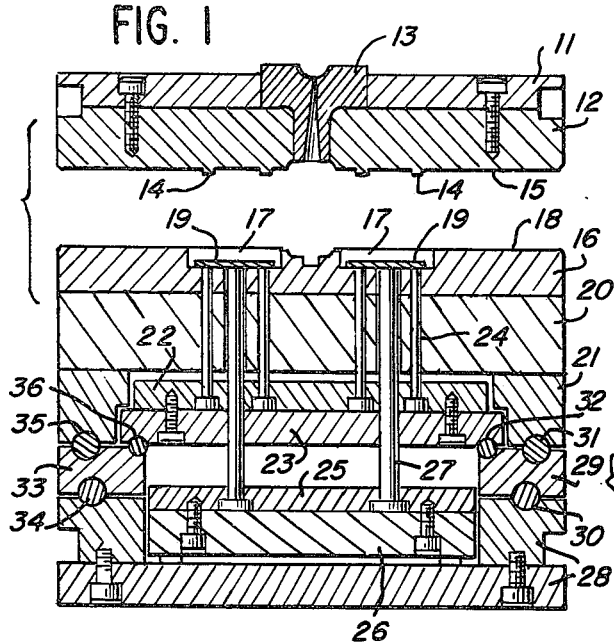
FIG. 1 is a cross-section of the mold assembly in its open configuration.

As shown in the drawings, the mold assembly comprises an "A" side having a top clamping plate 11 rigidly attached to an "A" plate 12. A sprue bushing 13 is mounted through plates 11 and 12 and serves as an inlet port for the supply of injection material to the mold cavities. Stationary insert clamping pins 14 are provided on the face 15 of the "A" plate 12 at a location which will be described hereinafter.

In a position opposed to "A" plate 12 and in a spaced relationship when the mold is open is a "B" plate 16 having mold cavities 17 formed in the outer face 18 thereof. Mold cavities 17 are appropriately dimmensioned and shaped to receive an insert 19. It is understood that the shape of the mold cavities 17 and inserts 19 will depend on the particular application and may be varied by those skilled in the art for the particular application on hand. The "B" plate 16 is rigidly attached to a support plate 20. Plate 21 is rigidly attached to "B" plate 16 and support plate 20 to form a unitized structure.

Moveable clamping pins 24 extending through "B" plate 16 and support plate 20 are rigidly fixed to clamping pin retainer plate 22 and retainer plate 23. Plates 22 and 23 are rigidly attached to each other to form a unitized structure. Clamping pins 24 are located opposite stationary clamping pins 14 and are positioned to enter into the mold cavity 17 when the "A" and "B" side mold sections are brought together. The mechanism of movement will be described more fully hereinafter.

An ejector pin plate 25 retains ejector pins 27 and is supported by ejector plate 26 which is rigidly attached thereto. Ejector pins 27 pass through plates 20 and 23, support plate 20 and "B" plate 16 and are adapted to enter insert cavities 19 to eject the molded article when the injection operation has been completed. Ejector pin plate 25 and ejector plate 26 are retained within an ejector housing 28.

A lever 29 is provided on one side of the mold between ejector housing 28 and plate 21 and along with rolls 30, 31 and 32 provides a mechanism for apportioning the mold clamping forces between the mold parting line and the clamping pins. An identical mechanism comprising lever 33 and rolls 34, 35 and 36 is provided at the opposite side of the mold. On one side of the mold, lever 29 bears on roll 30, which bears on ejector housing 28, and rolls 32 and 31, which bear on the clamping pin retaining plate 23 and plate 21, respectively. Plate 21 has an offset portion defined by faces 37 and 39 of plate 21. That offset portion is adapted to accomodate clamping retainer plate 23 between lever 29 and face 37 on the one side and between lever 33 and face 37 on the opposite side. The height of the offset portion of plate 21 is greater than the thickness of clamping pin retainer plate 23 to permit movement of the "B" side clamping pin retaining plate 23 relative to the ejector housing 28. Face 37 of plate 21 also provides a stop means to prevent excessive movement of clamping pin retaining plate 23. The size of the gap between face 37 of plate 21 and and face 38 of plate 23 is chosen to accomodate thickness variations in the inserts 19.

Figure 2:
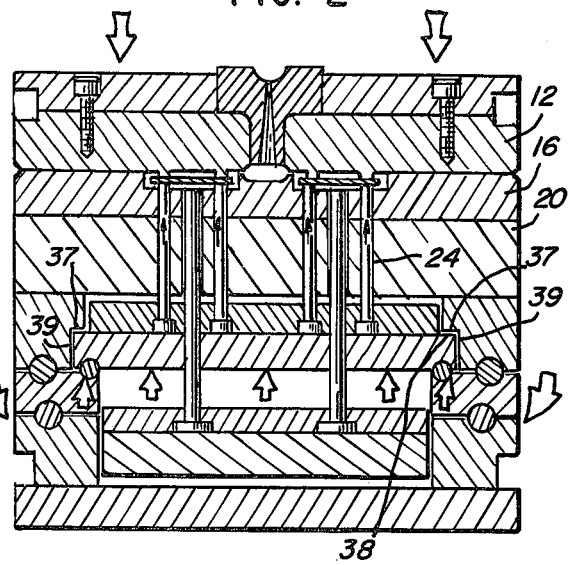
FIG. 2 is a cross-section of the mold assembly in its closed configuration.
Figure 3:
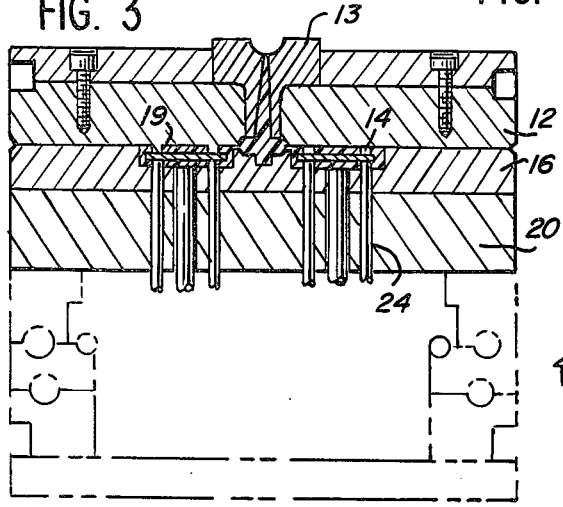
FIG. 3 is a partial cross-section of the mold assembly illustrating the injection step.
Figure 4:
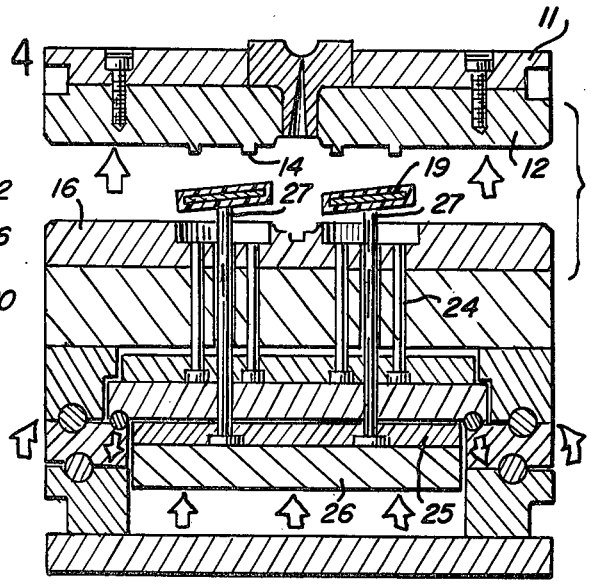
FIG. 4 is a cross-section of the mold assembly illustrating the ejection step.
Figure 5:
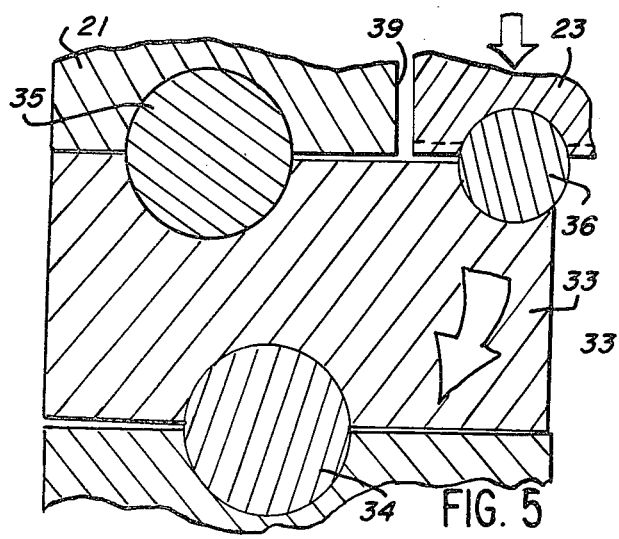
FIG. 5 is an enlarged view of the lever mechanism of the present invention in the thick insert position.
Figure 6:
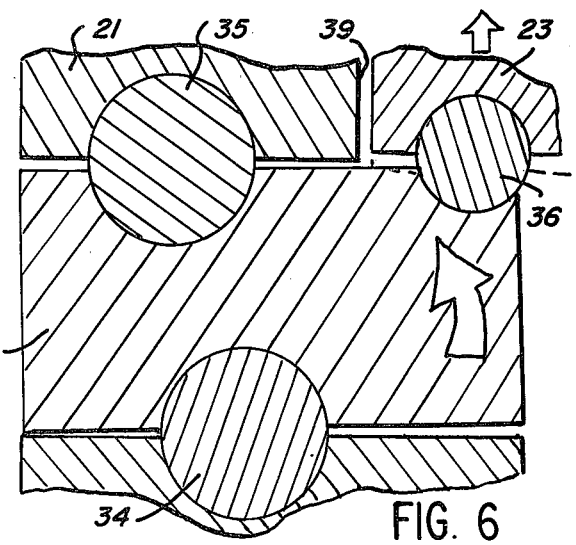
FIG. 6 is an enlarged view of the lever mechanism in the thin insert position.

When clamping pressure is applied to the mold sections, the forces on the ejector housing 28 are transmitted through rolls 30 and 34 to move "A" plate 12 and "B" plate 16 to a closed configuration, as shown most clearly in FIG. 2. When the mold faces 15 and 18 meet, and if clamping pins 24 and 14 are not in contact with insert 19, forces are transmitted through the lever mechanism to move retainer plate 23, clamping pin retainer plate 22 and clamping pins 24 in a direction toward the "A" side of the mold as shown in FIG. 6. Clamping pin retainer plate 22 and retainer plate 23 move as a unit relative to "B" plate 16, moving clamping pins 24 into contact with insert 19, until insert 19 is rigidly held between pins 24 and pins 14. As the clamping pressure increases to its operational limit, the clamping force is apportioned between retainer plate 23 and thus clamping pins 24, and "B" plate 16 in accordance with the lever arm, to increase the forces holding insert 19 between pins 14 and 24 and the forces closing the parting line between "A" plate 12 and "B" plate 16. When the operational clamping pressure limit is reached, injection material is supplied through the sprue bushing 13 into the mold cavity 17 as shown in FIG. 3. After the injection step has been completed, the clamping pressure is released. The mold sections then are retracted in a conventional manner. Activation of the ejector pins, also in a conventional manner, forces insert 19 encased in plastic out of cavity 17, as shown in FIG. 4. A new insert is added and the process is repeated.

The ratio of the clamping forces applied to the clamping pins and that applied to closed the mold parting line is controlled by choice of the ratio of lengths of the lever arms. Accordingly, the forces applied to the mold parting line and the clamping pins can be predetermined. The apportioned forces are dependent on the ratio of the lengths of the lever arms and independent of the thickness variations in insert 19. For example, if the distance between the central axes of pins 34 and 35 and pins 30 and 31 is 1 inch and the distance between the center axes of pins 34 and 36 and pins 30 and 32 is 4.25 inches, the ratio of clamping force applied to the mold parting line and that applied to the clamping pins to hold the insert will be 4.25:1. For a 200 ton capacity machine, approximately 38 ton will be applied to the clamping pins and 162 ton to the parting line of the mold.

The horizontal center movement associated with the pivoting of lever arms 29 and 33 is negligible and can be accomodated by the relative movement between the top and bottom plates of ejector housing 28.

The illustrated embodiment of the invention has been found to be advantageous for ease of assembly and economical fabrication. Other apportionment means, e.g. hydraulic, can be utilized with the invention but the lever action is preferable. It is understood that in certain applications it may not be necessary to utilize support plates 11, 20 and 26. Furthermore, the sectioned plates may be machined as unit structures rather than bolted together as shown in the illustrated embodiment. Also, the invention can be practiced with single cavity-single pin molds, single cavity multiple pin molds and multiple cavity-single pin molds. For illustration purpose, the apportionment means has been associated with the movable "B" side of the mold assembly. However, it is understood that the apportionment means can be associated with the "A" side of the mold in a similar manner.

I claim:

1. In an injection mold assembly for encapsulating inserts, said assembly having an "A" side plate, a "B" side plate, mold clamping means associated therewith and an ejector housing, the improvement which comprises:
    "B" side clamping pin retaining means having at least one clamping pin retained thereon for clamping said inserts between said "A" side plate and said clamping pin, said "B" side clamping pin retaining means being movable relative to said ejector housing and said "B" plate, and
    apportionment means associated with said ejector housing and said "B" side clamping pin retaining means to direct a predetermined amount of mold clamping force to said "B" side clamping pin retaining means and said "B" plate, said apportionment means being a lever arm pivotably arranged between said ejector housing, said "B" side plate and said "B" side plate clamping pin retaining means.

2. The improvement as in claim 1 wherein said apportionment means comprises a first cylindrical roll positioned between said clamping pin retaining plate and said lever arm, a second cylindrical roll between said lever arm and said ejector housing and a third cylindrical roll between said lever arm and said "B" side plate of said mold, the axes of said rolls being displaced from one another to direct a predetermined amount of mold clamping force between said clamping pin retaining means and said "B" side plate of said mold.

3. The improvement as in claim 1 wherein said apportionment means comprises a lever arm, means forming load bearing surfaces between said ejector housing and said lever arm, means forming load bearing surfaces between said lever arm and said retainer plate and means forming load bearing surfaces between said lever arm and said "B" side plate.

4. The improvement as in claim 3 wherein said means forming load bearing surfaces are cylindrical rolls located in cylindrical cavities.

5. An injection mold assembly for encapsulating inserts comprising:
    means forming a mold cavity;
    mold clamping means for closing said mold cavity;

inserting clamping means within said mold cavity to accomodate inserts of varying thickness; and lever means for allocating a predetermined portion of the mold clamping forces between said means forming a mold cavity and said insert clamping means.

6. An assembly as in claim 5 wherein said forming means comprises an "A" side plate and a "B" side plate, said insert clamping means comprises at least one clamping member movable relative to said "B" side plate and said lever means comprises a pivotable lever arm between said "B" side plate and said clamping member to apportion a predetermined portion of mold clamping force between said "B" side plate and said clamping member.

* * * * *